US011140196B1

(12) United States Patent
Bilge et al.

(10) Patent No.: US 11,140,196 B1
(45) Date of Patent: Oct. 5, 2021

(54) MALWARE FINGERPRINTING ON ENCRYPTED TRANSPORT LAYER SECURITY (TLS) TRAFFIC

(71) Applicant: SYMANTEC CORPORATION, Mountain View, CA (US)

(72) Inventors: Leyla Bilge, Antibes (FR); Matteo Dell'Amico, Antibes (FR)

(73) Assignee: NORTONLIFELOCK INC., Tempe, AZ (US)

( * ) Notice: Subject to any disclaimer, the term of this patent is extended or adjusted under 35 U.S.C. 154(b) by 379 days.

(21) Appl. No.: 16/366,747

(22) Filed: Mar. 27, 2019

(51) Int. Cl.
*H04L 29/06* (2006.01)
*G06F 16/906* (2019.01)

(52) U.S. Cl.
CPC .......... *H04L 63/145* (2013.01); *G06F 16/906* (2019.01); *H04L 63/0428* (2013.01); *H04L 63/0823* (2013.01); *H04L 63/1416* (2013.01); *H04L 63/1433* (2013.01); *H04L 63/166* (2013.01); *H04L 63/20* (2013.01)

(58) Field of Classification Search
CPC ............... H04L 63/145; H04L 63/0823; H04L 63/1416; H04L 63/1433; H04L 63/20; H04L 63/0428; H04L 63/166; G06F 16/906
See application file for complete search history.

(56) References Cited

U.S. PATENT DOCUMENTS

| 9,152,703 | B1 * | 10/2015 | Satish | G06F 16/35 |
| 9,386,028 | B2 * | 7/2016 | Altman | G06F 21/554 |
| 10,581,892 | B2 * | 3/2020 | Rostami-Hesarsorkh | G06N 20/00 |
| 2018/0139214 | A1 * | 5/2018 | Anderson | H04L 63/1408 |
| 2019/0245866 | A1 * | 8/2019 | Anderson | H04L 63/166 |
| 2019/0260775 | A1 * | 8/2019 | Bartos | G06F 21/552 |
| 2019/0286747 | A1 * | 9/2019 | Modarresi | G06F 16/906 |
| 2019/0354457 | A1 * | 11/2019 | Urmanov | H04L 63/1425 |

(Continued)

OTHER PUBLICATIONS

Hatada, Mitsuhiro, and Tatsuya Mori. "Finding New Varieties of Malware with the Classification of Network Behavior." IEICE Transactions on Information and Systems 100.8 (2017): 1691-1702. (Year: 2017).*

(Continued)

*Primary Examiner* — Michael R Vaughan
(74) *Attorney, Agent, or Firm* — Maschoff Brennan (57) ABSTRACT

Malware fingerprinting on encrypted Transport Layer Security (TLS) traffic. A method may include obtaining, by the computing device, input data of a TLS communication between a client device and a server device; extracting, by the computing device, features associated with the TLS communication; determining, by the computing device, an association between the TLS communication and a known malware family by applying a clustering algorithm to the extracted features; analyzing, by the computing device, at least one cluster determined by applying the clustering algorithm to determine a purity level; assigning, by the computing device, a malware family fingerprint to the TLS communication based on the purity level; applying, by the computing device, the malware family fingerprint to a backend of a network to determine a probability of an attack; and initiating, by the computing device, a security action based on the probability of the attack.

20 Claims, 3 Drawing Sheets

(56) References Cited

U.S. PATENT DOCUMENTS

2020/0120107 A1* 4/2020 McGrew .............. H04L 63/126

OTHER PUBLICATIONS

Aragorn; "Malicious Encrypted Traffic Detection"; presented at: HITCON CMT 2018; located at: https://hitcon.org/2018/CMT/slide-files/d1_s1_r4.pdf; accessed on Mar. 27, 2019; 58 pages.
Strasak, F. et al.; "Detecting Malware even when its Encrypted—Machine Learning for Network HTTPS Analysis"; located at: https://2018.bsidesbud.com/wp-content/uploads/2018/03/seba_garcia_frantisek_strasak.pdf; accessed on Mar. 27, 2019; 27 pages.
Lulli, A. et al.; "NG-DBSCAN Scalable Denisity-Based Clustering for Arbitrary Data"; Proceedings of the VLDB Endowment, vol. 10, No. 3; 2016; located at: http://www.vldb.org/pvldb/vol10/p157-lulli.pdf; accessed on Mar. 27, 2019; 12 pages.
Anderson, B.; "Deciphering Malware's use of TLS (without Decryption)"; 2016; located at: https://arxiv.org/pdf/1607.01639.pdf; accessed on Mar. 27, 2019; 15 pages.
Anderson, B.; "Machine Learning for Encrypted Malware Traffic Classification: Accounting for Noisy Labels and Non-Stationarity"; presented at KDD '17; Aug. 13-17, 2017;10 pages.
Anderson, B.; "Identifying Encrypted Malware Traffic with Contextual Flow Data"; presented at: AI Sec '16; Oct. 28, 2016; located at: http://library.usc.edu.ph/ACM/SIGSAC%202017/aisec/p35.pdf; accessed on Mar. 27, 2019; 12 pages.

* cited by examiner

MALWARE FINGERPRINTING ON ENCRYPTED TRANSPORT LAYER SECURITY (TLS) TRAFFIC

BACKGROUND

The Transport Layer Security (TLS) protocol is a cryptographic protocol to provide secure communications over a computer network. When secured by TLS, connections between a client device and a server device may employ symmetric cryptography to secure the connection. In addition, the identity of the parties may be authenticated using public-key cryptography. TLS may support different methods or algorithms for exchanging keys, encrypting data, and authenticating message communication.

In addition to securing legitimate communications, there has been an increase in the amount of malware communication with and through computing devices using TLS. For example, the number of malware samples that used TLS recently increased from 1000 events to over 200,000 events per quarter, with the number of events increasing to over 1.7 million over the course of a year. The increase in malicious TLS usage may be a desire for a malicious actor to hide the command and control (C&C) server connection made by the attacker, as well as to evade being detected by malware intrusion detection systems that rely on content analysis (i.e., by decrypting the encrypted communication).

SUMMARY

In some embodiments, a computer-implemented method for malware fingerprinting on encrypted TLS traffic may be performed, at least in part, by a computing device including one or more processors. The method may include obtaining, by a computing device, input data of a TLS communication between a client device and a server device; extracting, by the computing device, features associated with the TLS communication; determining, by the computing device, an association between the TLS communication and a known malware family by applying a clustering algorithm to the extracted features; analyzing, by the computing device, at least one cluster determined by applying the clustering algorithm to determine a purity level; assigning, by the computing device, a malware family fingerprint to the TLS communication based on the purity level; applying, by the computing device, the malware family fingerprint to a backend of a network to determine a probability of an attack; and initiating, by the computing device, a security action based on the probability of the attack.

In some embodiments, the initiating the security action may include initiating one or more of isolating the client device, isolating the server device, transmitting a message to an administrator, or applying a malware family-specific security action to a TLS connection identified as malicious, or a combination thereof.

In some embodiments, the method may include normalizing the input data of the TLS communication using a term frequency-inverse document frequency (TF-IDF) model.

In some embodiments, the method may include associating the TLS communication with a malware family based on identifying a similarity of features between the TLS communication and communications associated with the malware family.

In some embodiments, the obtaining of input data may further include executing known instances of malware in a sandbox for a pre-determined time period; collecting data regarding network traffic of the known instances of malware; and collecting data regarding a TLS handshake of the known instances of malware.

In some embodiments, the extracting may further include extracting from an unencrypted portion of the TLS communication one or more of a server validation status, a server name, a compression method of a TLS version, ciphers supported by the client device, ciphers chosen by the server device, TLS extensions supported by the server devices, TLS extensions supported by the client device, a server certificate validity, a client device certificate validity, whether a certificate is self-signed, or a number of client certificates in a chain number of server certificates, or a combination thereof.

In some embodiments, the extracting may further include extracting from an encrypted portion of the TLS communication one or more of a number of encrypted bytes sent and received, a number of encrypted packets sent and received, a duration of encrypted traffic sent and received, a ratio of data sent and received, an average packet size, a maximum contiguous packet sequence length, a packet size distribution, or interarrival patterns, or a combination thereof.

In some embodiments, the applying of the clustering algorithm may further include applying a distance function on the TLS communication.

In some embodiments, the determining of the purity level may include determining that a similarity between the TLS communication and a communication by a known malware family satisfies a pre-determined threshold.

In some embodiments, before applying the malware family fingerprint to the backend, the method may include applying the malware family fingerprint to a known-benign TLS network to identify benign TLS connections; and applying the malware family fingerprints to connections not identified as benign TLS connections.

In some embodiments, a computer device may include a processor, a memory in electronic communication with the processor, and instructions stored in the memory, with the instructions being executable by the processor to perform a method for malware fingerprinting on encrypted TLS traffic.

In some embodiments, one or more non-transitory computer-readable media may include one or more computer-readable instructions that, when executed by one or more computing devices, cause the one or more computing devices to perform a method for malware fingerprinting on encrypted TLS traffic.

BRIEF DESCRIPTION OF THE DRAWINGS

Embodiments will be described and explained with additional specificity and detail through the use of the accompanying drawings in which.

DETAILED DESCRIPTION

The increase in malicious TLS usage may be a desire for a malicious actor to hide the command and control (C&C) server connection made by the attacker, as well as to evade being detected by malware intrusion detection systems that rely on content analysis (i.e., by decrypting the encrypted communication). When malicious actors turn to TLS to hide their communications, it may be difficult to determine whether the traffic is malware due to the fact that the communications are encrypted and it is difficult to decrypt the content. Thus, the embodiments described herein distinguish between benign traffic and malicious traffic, and further characterize the malicious traffic by determining an associated malware family. Determining which family the attack originated with results in more effective security prevention and remediation.

Figure 1:
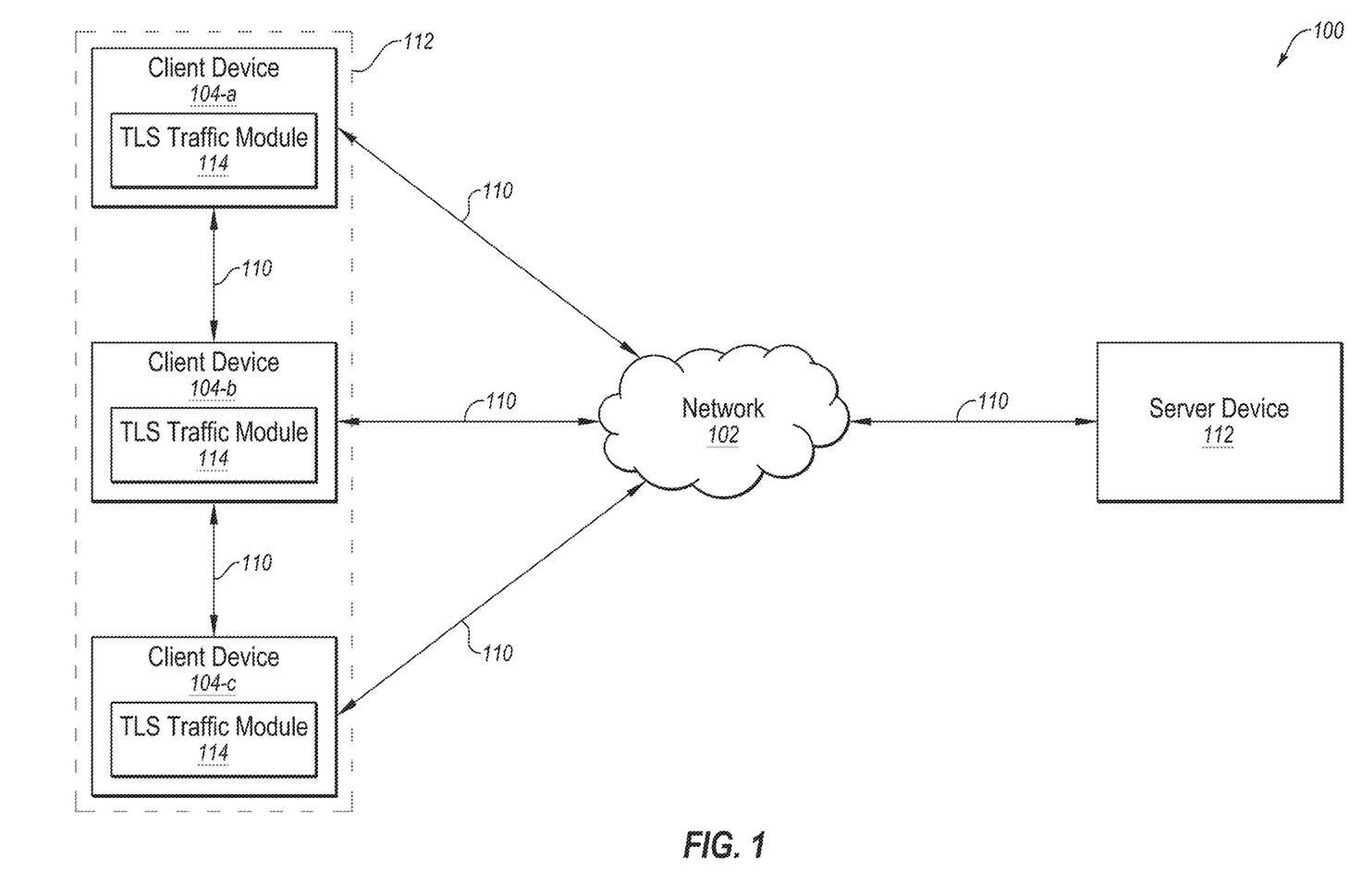
FIG. 1 illustrates an example system configured for malware fingerprinting on encrypted TLS traffic.

Turning to the figures, FIG. 1 illustrates an example system 100 configured for malware fingerprinting on encrypted TLS traffic. The system 100 may include a network 102, client devices 104-*a*, 104-*b*, and 104-*c*, and/or a server device 106. In one embodiment, each of the client devices 104-*a*, 104-*b*, and 104-*c* may execute a TLS traffic module 114. In an additional or alternative embodiment, the TLS traffic module 114 may operate on a standalone computing device, on the server device 106, or on another computing device.

In some embodiments, the network 102 may be configured to communicatively couple the client devices 104-*a*, 104-*b*, and/or 104-*c* and/or the server device 106. In some embodiments, the network 102 may be any wired or wireless network, or combination of multiple networks, configured to send and receive communications between systems and devices by way of example communication links 110. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

In some embodiments, the client devices 104-*a*, 104-*b*, and 104-*c* may be computer systems capable of communicating over the network 102 with each other and server device 106. Examples of these computer systems are disclosed herein in connection with the computer system 300 of FIG. 3. In some embodiments, the client devices 104-*a*, 104-*b*, and 104-*c* may each be a computer device, such as a smartphone, desktop computer, laptop computer, control system, tablet, wearable computer device, etc. In some embodiments, the client devices 104-*a*, 104-*b*, and 104-*c* may be devices that make up an enterprise 112. Although client devices 104-*a*, 104-*b*, and 104-*c* are specifically shown as connected through communication links 110, any device may be in communication with another device through communication links 110, and communication between devices is not limited to that shown in FIG. 1.

In some embodiments, the server device 106 may be any computer system capable of communicating over the network 102 with the client devices 104-*a*, 104-*b*, and/or 104-*c*, and/or the TLS traffic module 114.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, it is understood that the communication links 110 between the components illustrated in FIG. 1 (illustrated as left-right arrows) may be part of the network 102 or another network.

As malicious actors increasingly use TLS traffic to avoid detection, it may become more important to identify C&C communications from a particular malware family without having to decrypt the content of the TLS traffic. Instances of malware may be written by a single individual (or a group) and thus some instances of malware may share recognizable shared characteristics making it possible to classify malware into "families." Malware families may include, but are not limited to Upatre, Mailru, Vtflodder, Browserio, 4shared, Zbot, Spigot, Zasy, Adposhel, and shiz. Malware types within each family may include trojans, spyware, phishing, etc.

Thus, in one embodiment, TLS traffic module 114 may enable passive analysis of TLS traffic passing through network 102. TLS traffic module 114 may therefore analyze both the unencrypted portion of a communication, as well as an encrypted portion of the communication to determine if the traffic is benign and normal, or if the traffic belongs to a specific malware family. In the case where the traffic is determined to belong to a specific malware family, a security action may be implemented to halt communications and/or determine which of the client devices 104-*a*, 104-*b*, or 104-*c* is a troublesome gateway.

In one embodiment, any or all of the client devices 104-*a*, 104-*b*, or 104-*c* may be considered a gateway that routes traffic between the enterprise 112 and the server device 106. In one embodiment, TLS traffic module 114 may execute at any or all of these gateways in order to identify encrypted malicious traffic specific to a malware family.

More specifically, before a client device (e.g., client device 104-*a*, 104-*b*, and 104-*c*) and a server device (e.g., server device 106) exchange information with one another, an algorithm is used to encrypt the intended traffic. In one embodiment, a TLS handshake enables the client device and the server device to establish secret encryption keys with which the devices will communicate. The client device and the server device will thus agree on a version of the protocol to use (e.g., TLS 1.0, 1.1, 1.2, 1.3, etc.), select the cryptographic algorithm, authenticate one another by exchanging and validating digital certificates, and use asymmetric encryption techniques to generate a shared secret key. In some embodiments, malware actors may encrypt traffic using a specific algorithm or an algorithm in a specific way, which may help to distinguish between different malware families.

In one embodiment, for each TLS connection, there may be a unique connection identifier, and TLS handshake data may be used as a "fingerprint" to determine whether a client application or library is benign or whether the client application is part of a specific malware family. Without being able to determine to which family the client applications belongs, a system analyzing malware may result in false positives. False positives may result in the inability to address security threats sufficiently.

Features from both an unencrypted portion of the handshake and an encrypted portion of the handshake may be extracted by the TLS traffic module 114. In one embodiment, TLS connection data extracted from the unencrypted portion of the handshake may include, but is not limited to, server validation status, server_name (SNI), the compression method of the version of the TLS supported/negotiated, ciphers supported by the client device 104, ciphers chosen by the server device 106, TLS extensions supported by the client device 104 and server device 106, server device certificate validity, client device certificate validity, whether the certificate is self-signed, or the number of client certificates in the chain number of server certificates, or some combination thereof.

In alternative or additional embodiments, TLS connection data extracted from an encrypted portion of the handshake may include, but is not limited to, the number of encrypted bytes sent and received, the number of encrypted packets sent and received, the duration of encrypted traffic sent and received, statistics combining these features such as a ratio of data sent and received, the average packet size, the maximum contiguous packet sequence length, packet size distribution, or interarrival patterns, or some combination thereof.

The amount of TLS connection data collected, however, may be significant in size, complex, and highly dimensional, making it potentially difficult to determine an association between an application and a specific malware family. Therefore, a scalable clustering algorithm may be used which enables defining ad-hoc distance functions on the TLS connection data.

In one embodiment, for each TLS connection, the TLS traffic module 114 may define two distances that are then aggregated through a weighted sum. An Euclidean distance may be used for numeric features (e.g., message size, time between two consecutive packets, etc.), whereas one-hot encoding may be used for categorical features (e.g., server DNS name and IP address, the supported cyphers, TLS version, whether the certificate is self-signed, etc.). For example, in a large sparse matrix, each TLS connection may correspond to a row, and each category (e.g., a single server IP address, TLS version, cypher or set of supported cyphers, etc.) may correspond to a column. The matrix may be normalized using term frequency-inverse document frequency (TF-IDF) normalization in order to lower the weight of common features found in the data and enhance rarer, more unique features of the data. For example, using TF-IDF, the TLS traffic modules 114 may determine how frequently a term occurs and the term's inverse document frequency. The higher the TF-IDF score, the rarer the term. Once the normalization is completed, the TLS traffic module 114 may use a cosine distance for categorical features.

Once the clustering algorithm is done, the TLS traffic module 114 analyzes the clusters to identify which clusters are pure enough to be used as a signature for a particular malware family. Because the clustering algorithm processes all of the TLS connections observed in the network traffic, some of the connections may be benign connections. In one embodiment, benign connections may not be clustered by the algorithm due to the fact that a benign connection may have characteristics shared among a variety of malware families, and thus will not provide enough similarity between other connection to be associated with a specific malware family. In contrast, a cluster that includes characteristics from only a particular family may be considered a "pure" cluster, and may then be used as a fingerprint to identify a specific malware family. Each family that generated an identifiable TLS connection is labeled accordingly, such that clusters containing labels from only a single malware family are candidates for fingerprinting (i.e., "pure").

In one embodiment, some of the labeled families will attempt to hide their communications using the TLS protocol. Each of the application that use the TLS protocol are identified and queried using an antivirus software to obtain a malware family's antivirus label. TLS traffic module 114 may then parse the labels and identify the most frequently occurring substrings on each label assigned by various antivirus software order to identify the name of the family associated with the identified application. If a communication is flagged as benign by the antivirus software, that communication may be labeled as benign and used at a later time to estimate false positives.

Once a fingerprint has been identified for a specific malware family, but before the fingerprint is used to control the potential malware, the fingerprints may be applied on a presumably benign network to determine which fingerprints match which TLS traffic. Only fingerprints not observed in the known-benign TLS traffic will be used to determine potential malware communications.

Thus, the fingerprint may be applied the on a back end to block the malicious traffic or be deployed to the ingress of an enterprise network to identify an infected machine. Other security actions may include sending a notification to the user of the determined infected device or an administrator, blocking the infected machine from network connectivity (e.g., from outside communications, communications within the enterprise, etc.), enabling anti-malware software, etc.

Each of the actions performed by the TLS traffic module 114 may be automatically applied by a machine learning model, where the machine learning model updates and adapts to improve the prediction of malicious traffic over a TLS protocol.

Figure 2:
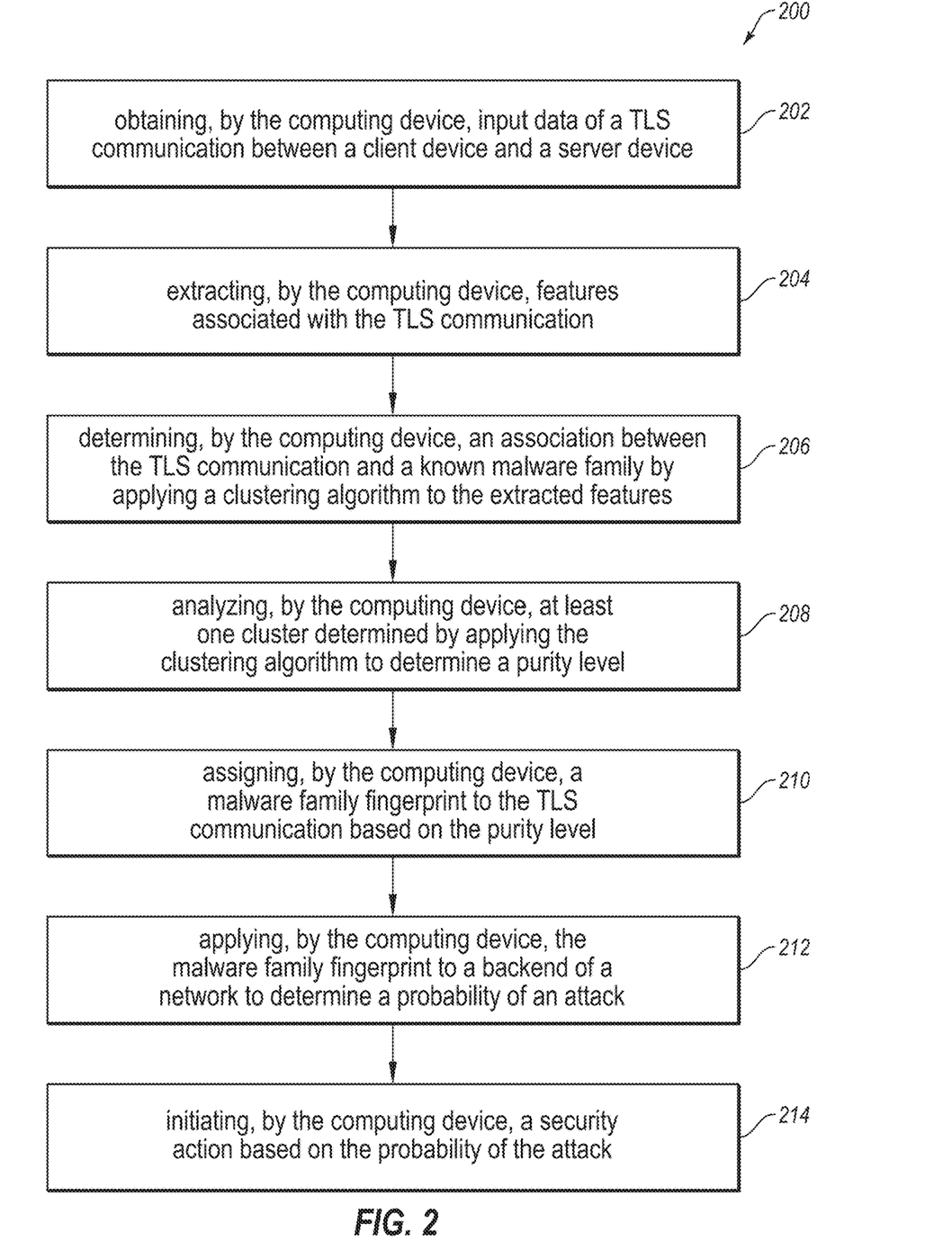
FIG. 2 illustrates a flowchart of an example method for malware fingerprinting on encrypted TLS traffic.

FIG. 2 illustrates an example method 200 for malware fingerprinting on encrypted TLS traffic. The method 200 may be performed, in some embodiments, by a device or system, such as by one or more of the client devices 104-a, 104-b, 104-c, the TLS traffic module 114, and/or the server device 106. In these and other embodiments, the method 200 may be performed by one or more processors based on one or more computer-readable instructions stored on one or more non-transitory computer-readable media. The method 200 will now be described in connection with FIG. 1.

Method 200 may include, at action 202, obtaining, by the computing device, input data of a TLS communication between a client device and a server device. For example, TLS traffic module 114 may obtain data related to a TLS communication between server device 106 and at least one of client devices 104-a, 104-b, or 104-c.

Method 200 may include, at action 204, extracting, by the computing device, features associated with the TLS communication. For example, TLS traffic module 114 may extract features associated with the TLS communication between the server device and at least one of client devices 104-a, 104-b, or 104-c.

Method 200 may include, at action 206, determining, by the computing device, an association between the TLS communication and a known malware family by applying a clustering algorithm to the extracted features. For example, TLS traffic module 114 may applying a clustering algorithm to determine a similarity between the communication and a known malware family Method 200 may include, at action 206, analyzing, by the computing device, at least one cluster determined by applying the clustering algorithm to determine a purity level. For example, TLS traffic module 114 may determine a purity level where the purer the purity level, the more likely a TLS connection is associated with a known malware family.

Method 200 may include, at action 208, assigning, by the computing device, a malware family fingerprint to the TLS communication based on the purity level. For example, TLS traffic module 114 may apply the malware family fingerprint to communications with at least one of the client devices 104-a, 104-b, or 104-c Method 200 may include, at action 210, applying, by the computing device, the malware family fingerprint to a backend of a network to determine a probability of an attack. For example, TLS traffic module 114 may apply the malware family fingerprint to communications through network 102.

Method 200 may include, at action 212, initiating, by the computing device, a security action based on the probability of the attack. For example, TLS traffic module 114 may initiate an anti-malware action on at least one of the client devices 104-a, 104-b, or 104-c.

Although the actions of the method 200 are illustrated in FIG. 2 as discrete actions, various actions may be divided into additional actions, combined into fewer actions, reordered, expanded, or eliminated, depending on the desired implementation.

The systems and methods described herein may provide a plurality of benefits and technological improvements, and may result in the practical application of identifying more specific security threats and minimizing false positive with respect to identifying attacks. Furthermore, the systems and methods described herein provide a practical application of mitigating or preventing a security attack, as well as generally determining which specific malware family from which an attack originated, or at which computing device attacks are occurring. In addition, mitigation of and prevention of security attacks serves the practical application of protection a computing device and/or an enterprises' sensitive and private information.

Further, it is understood that the method 200 may improve the functioning of a computer system itself. For example, the functioning of any of the client devices 104-a, 104-b, and/or 104-c may itself be improved by the method 200 by reducing or eliminating the opportunity for an attacker to take control of any of the client devices 104-a, 104-b, or 104-c, or the enterprise 112. Also, the method 200 may improve the technological field of personal and business privacy and security stopping an attack before the attack occurs.

Figure 3:
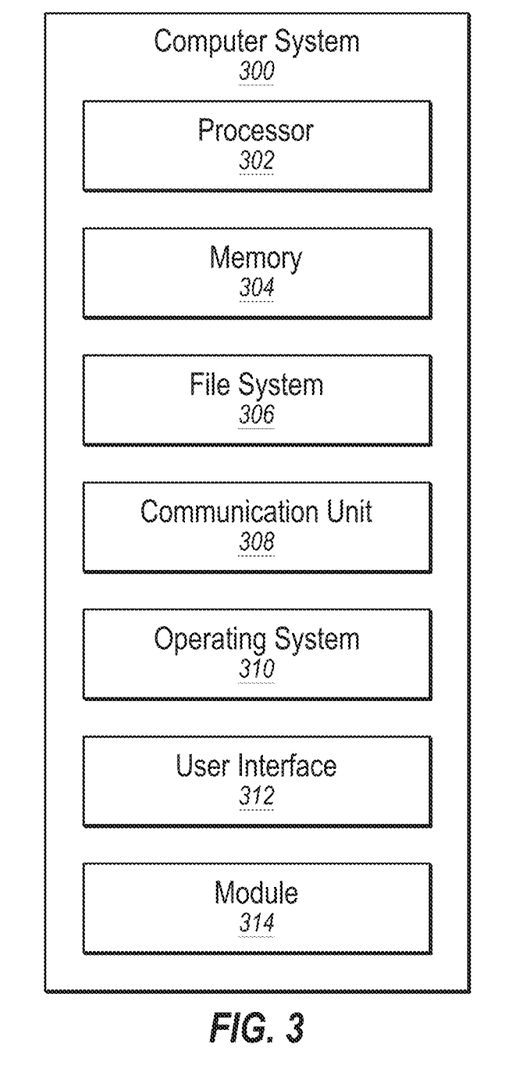
FIG. 3 illustrates an example computer system that may be employed in malware fingerprinting on encrypted TLS traffic.

FIG. 3 illustrates an example computer system that may be employed in malware fingerprinting on encrypted TLS traffic. In some embodiments, the computer system 300 may be part of any of the systems or devices described in this disclosure. For example, the computer system 300 may be part of any of the client devices 104-a, 104-b, and/or 104-c, the server device 106, and/or the TLS traffic module 114 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a wearable device (e.g., a smartwatch, heart rate monitor, oxygen detector, thermometer), a tablet computer, a portable music player, a networking device, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIG. 2. These computer-executable instructions may be included, for example, in the operating system 310, in one or more applications, such as the TLS traffic module 114 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more of the actions of the method 200 of FIG. 2. In some embodiments, the module 314 may be part of the operating system 310 or may be part of an application of the computer system 300, or may be some combination thereof. In some embodiments, the module 314 may function as the TLS traffic module 114 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for malware fingerprinting on encrypted transport layer security (TLS) traffic, at least a portion of the method being performed by a computing device comprising one or more processors, the method comprising:

obtaining, by the computing device, input data of a TLS communication between a client device and a server device;

extracting, by the computing device, features associated with the TLS communication;

determining, by the computing device, an association between the TLS communication and a known malware family by applying a clustering algorithm to the extracted features;

analyzing, by the computing device, at least one cluster determined by applying the clustering algorithm to determine a purity level;

assigning, by the computing device, a malware family fingerprint to the TLS communication based on the purity level;

applying, by the computing device, the malware family fingerprint to a backend of a network to determine a probability of an attack; and initiating, by the computing device, a security action based on the probability of the attack.

2. The method of claim 1, wherein the initiating of the security action further comprises:

initiating one or more of isolating the client device, isolating the server device, transmitting a message to an administrator, or applying a malware family-specific security action to a TLS connection identified as malicious, or a combination thereof.

3. The method of claim 1, further comprising:

normalizing the input data of the TLS communication using a term frequency-inverse document frequency (TF-IDF) model.

4. The method of claim 1, further comprising:

associating the TLS communication with a malware family based on identifying a similarity of features between the TLS communication and communications associated with the malware family.

5. The method of claim 1, wherein the obtaining of input data further comprises:

executing known instances of malware in a sandbox for a pre-determined time period;

collecting data regarding network traffic of the known instances of malware; and collecting data regarding a TLS handshake of the known instances of malware.

6. The method of claim 1, wherein the extracting further comprises:

extracting from an unencrypted portion of the TLS communication one or more of a server validation status, a server name, a compression method of a TLS version, ciphers supported by the client device, ciphers chosen by the server device, TLS extensions supported by the server device, TLS extensions supported by the client device, a server certificate validity, a client device certificate validity, whether a certificate is self-signed, or a number of client certificates in a chain number of server certificates, or a combination thereof.

7. The method of claim 1, wherein the extracting further comprises:

extracting from an encrypted portion of the TLS communication one or more of a number of encrypted bytes sent and received, a number of encrypted packets sent and received, a duration of encrypted traffic sent and received, a ratio of data sent and received, an average packet size, a maximum contiguous packet sequence length, a packet size distribution, or interarrival patterns, or a combination thereof.

8. The method of claim 1, wherein the applying of the clustering algorithm further comprises:

applying a distance function on the TLS communication.

9. The method of claim 1, wherein the determining of the purity level further comprises:

determining that a similarity between the TLS communication and a communication by a known malware family satisfies a pre-determined threshold.

10. The method of claim 1, further comprising:

before applying the malware family fingerprint to the backend, applying the malware family fingerprint to a known-benign TLS network to identify benign TLS connections; and applying the malware family fingerprint to connections not identified as benign TLS connections.

11. One or more non-transitory computer-readable media comprising one or more computer readable instructions that, when executed by one or more processors of a computing device cause the computing device to perform a method for malware fingerprinting on encrypted transport layer security (TLS) traffic, the method comprising:

obtaining, by the computing device, input data of a TLS communication between a client device and a server device;

extracting, by the computing device, features associated with the TLS communication;

determining, by the computing device, an association between the TLS communication and a known malware family by applying a clustering algorithm to the extracted features;

analyzing, by the computing device, at least one cluster determined by applying the clustering algorithm to determine a purity level;

assigning, by the computing device, a malware family fingerprint to the TLS communication based on the purity level;

applying, by the computing device, the malware family fingerprint to a backend of a network to determine a probability of an attack; and initiating, by the computing device, a security action based on the probability of the attack.

12. The one or more non-transitory computer-readable media of claim 11, further comprising:

normalizing the input data of the TLS communication using a term frequency-inverse document frequency (TF-IDF) model.

13. The one or more non-transitory computer-readable media of claim 11, further comprising:

associating the TLS communication with a malware family based on identifying a similarity of features between the TLS communication and communications associated with the malware family.

14. The one or more non-transitory computer-readable media of claim 11, wherein the obtaining of input data further comprises:

executing known instances of malware in a sandbox for a pre-determined time period;

collecting data regarding network traffic of the known instances of malware; and collecting data regarding the TLS communication of the known instances of malware.

15. The one or more non-transitory computer-readable media of claim 11, wherein the extracting further comprises:

extracting from an unencrypted portion of the TLS communication one or more of a server validation status, a server name, a compression method of a TLS version, ciphers supported by the client device, ciphers chosen by the server device, TLS extensions supported by the server device, TLS extensions supported by the client device, a server certificate validity, a client device certificate validity, whether a certificate is self-signed, or a number of client certificates in a chain number of server certificates, or a combination thereof.

16. The one or more non-transitory computer-readable media of claim 11, wherein the extracting further comprises:

extracting from an encrypted portion of the TLS communication one or more of a number of encrypted bytes sent and received, a number of encrypted packets sent and received, a duration of encrypted traffic sent and received, a ratio of data sent and received, an average packet size, a maximum contiguous packet sequence length, a packet size distribution, or interarrival patterns, or a combination thereof.

17. The one or more non-transitory computer-readable media of claim 11, wherein the applying the clustering algorithm further comprises:

applying a distance function on the TLS communication.

18. The one or more non-transitory computer-readable media of claim 11, wherein the determining of the purity level further comprises:

determining that a similarity between the TLS communication and a communication by a known malware family satisfies a pre-determined threshold.

19. The one or more non-transitory computer-readable media of claim 11, further comprising:

before applying the malware family fingerprint to the backend, applying the malware family fingerprint to a known-benign TLS network to identify benign TLS connections; and applying the malware family fingerprint to connections not identified as benign TLS connections.

20. A system for determining for malware fingerprinting on encrypted transport layer security (TLS) traffic, the system comprising:

a processor;

a memory in electronic communication with the processor; and instructions stored in the memory, the instructions being executable by the processor to:

obtain input data of a TLS communication between a client device and a server device;

extract, by the computing device, features associated with the TLS communication;

determine an association between the TLS communication and a known malware family by applying a clustering algorithm to the extracted features;

analyze at least one cluster determined by applying the clustering algorithm to determine a purity level;

assign a malware family fingerprint to the TLS communication based on the purity level;

apply the malware family fingerprint to a backend of a network to determine a probability of an attack; and initiate a security action based on the probability of the attack.

* * * * *